Figure 1:
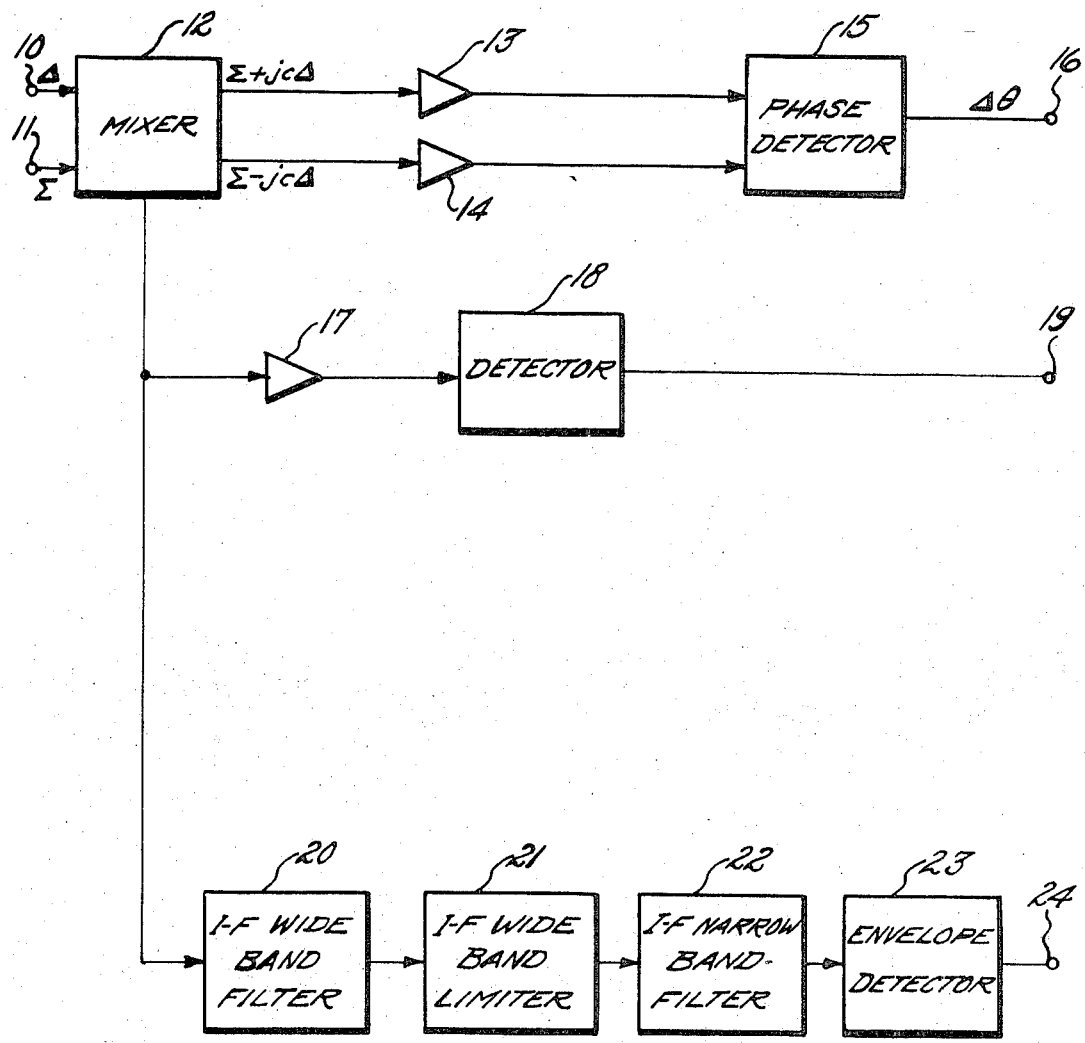

United States Patent [19]
Ruvin et al.

[11] 3,859,661
[45] Jan. 7, 1975

[54] ANTI-JAMMING RADAR RECEIVER
[75] Inventors: Abraham E. Ruvin, Massapequa;
Charles A. Fowler, Upper Brookville, both of N.Y.
[73] Assignee: The United States of America as represented by the Secretary of the Air Force, Washington, D.C.
[22] Filed: Dec. 23, 1963
[21] Appl. No.: 332,980

[52] U.S. Cl............. 343/18 E, 343/11 R, 343/16 M
[51] Int. Cl.......................... G01s 7/16, G01s 7/36
[58] Field of Search.......... 343/18, 16, 16.1, 12, 13, 343/17.1, 11, 16 M, 18 E; 325/473, 474, 476, 477, 482

Primary Examiner—Malcolm F. Hubler
Attorney, Agent, or Firm—Harry A. Herbert, Jr.; George Fine

EXEMPLARY CLAIM

2. In an anti-jamming radar having an antenna propagating a pair of beams at the same elevation angle in two closely spaced azimuth directions and receiving first and second incoming signals to be added and subtracted to provide a separate sum and difference signals, a radar receiver and its associated display oscilloscope comprising a mixer receiving said sum and difference signal for mixing and providing three output signals, a first detector receiving a first and second input signal by way of said mixer and providing an output signal that is representative of the ratio of said sum and difference signal, a second detector receiving said third output signal from said mixer and providing a normal video output signal, a wide-band filter also receiving said third output signal, a narrow band filter receiving the output signal from said wide-band filter by way of a wide-band limiter, a third detector connected to said narrow band filter and also operating to provide a video output signal, an oscilloscope having cathode, control grid and a pair of vertical and horizontal deflection plates, said video output signals from said second and third detectors being applied to said control grid, said vertical plates receiving a range sweep voltage, a summing amplifier having two inputs, one of said two inputs receiving the output signal from said first detector, the other of said two inputs receiving a d.c. voltage representative of the azimuth angle of said antenna, and a push-pull amplifier receiving the resultant signal from said summing amplifier and operating to provide a pair of signals to said pair of horizontal plates.

3 Claims, 2 Drawing Figures

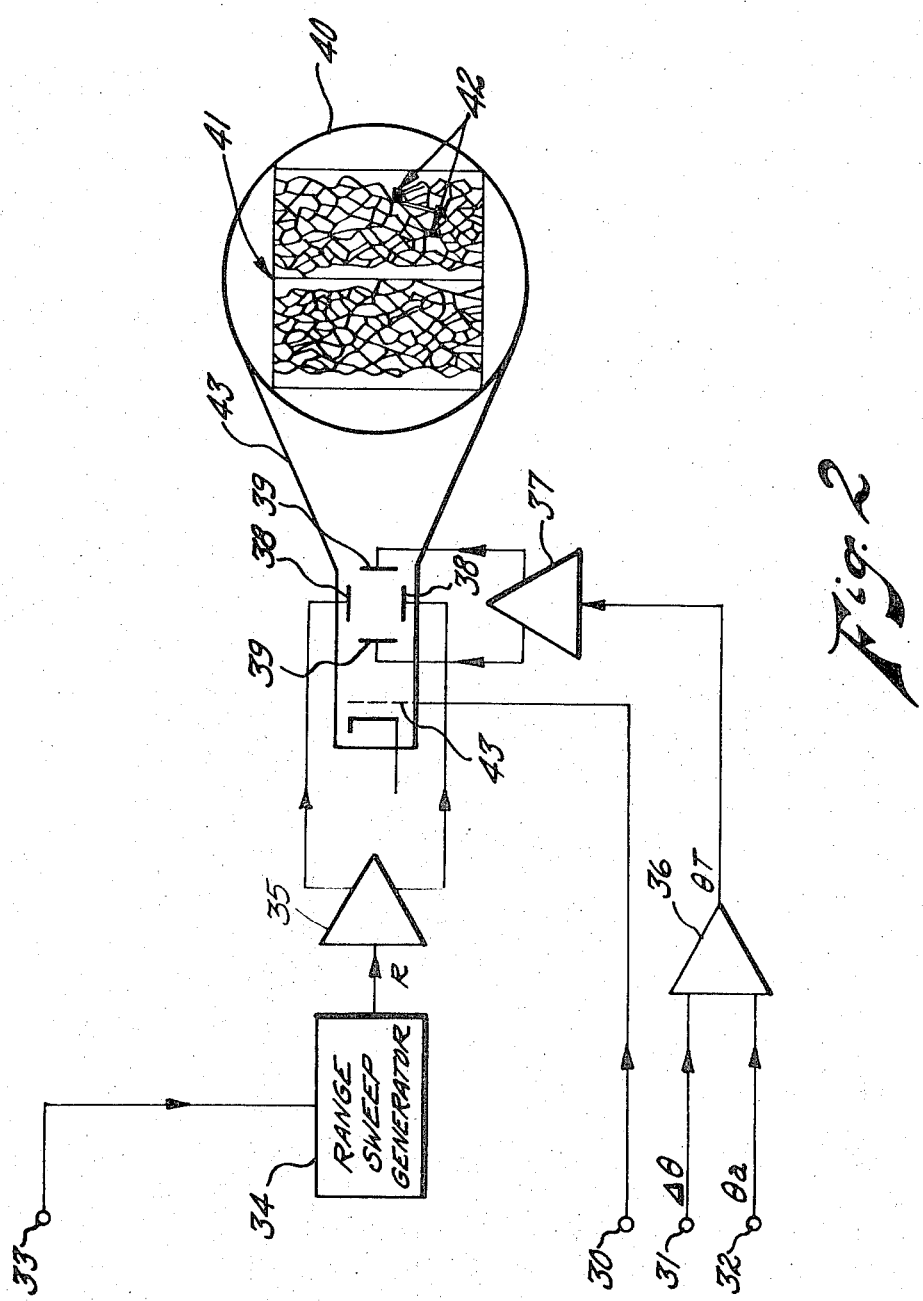

ANTI-JAMMING RADAR RECEIVER

This invention relates to an anti-jamming radar and more specifically to its associated receiver and oscilloscope wherein the direction of the jammer is presented along an intensified line and a target is visible along the line.

In a radar system such as the monopulse A-J (anti-jamming) type, there is employed an antenna feed and reflector system that propogates two radar beams at the same elevation angle in two closely-spaced azimuth directions. One beam thus picks up an incoming signal before the other beam, thereby providing two incoming signals.

The aforementioned antenna is comprised of a conventional reflector fitted with dual feed horns so placed that two free space antenna beams are formed which are identical except for symetrical displacement in azimuth about the center line of the antenna. This configuration is designated as being a "monopulse antenna." The incoming signals from the two feed horns pass through a hybrid junction and are mixed to form a sum and difference signal which are then heterodyned to provide sum and difference signals at an intermediate frequency.

The aforementioned radar also utilizes a "pinch" receiver in which a ratio of the difference signal to the sum signal is obtained which gives a measure of angular difference between the antenna axis and the line of sight to the target. When this ratio is added to a d.c. voltage that represents the antenna angle, the resultant sum is a measure of the true angle regardless of the position of the antenna. This target angle voltage is then used as the horizontal signal in a B-scope display so that all of the return from a given target paint at the same point on the display even though the antenna bandwidth is several times as great as the display spot size. This is known as the "pinch" effect.

This type of accurate pinch display can be used to important advantage for several applications requiring accurate target azimuth location or anti-jamming operation. In operation, the pinch system is adjusted so that good pinching is obtained throughout the major portion of the main lobe of the antenna pattern and so that no spurious pinching action will occur in the side lobes. This point becomes important when pinching action is considered in the presence of a jammer. Without spurious side-lobe pinching, the density of painting due to the jammer signal in the side lobes is roughly the same as that with no signal until the sweep line moves rapidly to a point corresponding to the jammer azimuth and proceeds to deposit a large number of sweeps on top of each other. This continues until the jammer is out of the main lobe; at this point, the sweep line resumes painting with a density of approximately one sweep per pulse period of antenna revolution. Thus, in terms of painting density, only true azimuth differs markedly from one sweep per pulse period, and it is readily discernible even though the normal video signal, which provides the intensity modulation, is at limit level throughout the side lobes.

The foregoing technique causes signals from a jammer to be presented along a "line" or a "strobe" on the scope display to indicate the direction of the jammer. However, while performing the useful function of locating a jammer, the "strobe" also hides a target having the same azimuth as the jammer even when the target signal is stronger than the jamming signal.

The present invention includes as one of its features the utilization of a jammer strobe that will not obscure the target signal as long as the target signal is stronger than the jamming signal. In accordance with the present invention, a receiving system is provided which extracts the jammer direction in the form of a visible strobe as well as the return signal radar range in the form of an intensification of the strobe at the radar range. This type of display provides in a single indicator the indication of jamming without obliterating the return signal as long as it is stronger than the jamming signal.

An object of the present invention is to provide a receiver system for an anti-jamming radar wherein the direction of a jammer is presented along a line and a target return signal is observable as an intensification of the line.

Another object of the present invention is to provide a receiver system for an anti-jamming radar in which the direction of a jammer is indicated by an intensified line on a display scope and a target return signal in that direction is not obscured by the intensified line but appears as an intensification of a spot on the line.

The various features which characterize this invention are pointed out with particularity in the claims annexed to and forming part of this specification. For a better understanding of this invention, however, its advantages and specific objects obtained with its use, reference should be had to the accompanying drawings and descriptive matter in which is illustrated and described a preferred embodiment of the present invention.

FIG. 1 shows a block diagram of the pinch radar receiver of the present invention; and FIG. 2 shows partly in schematic and partly in block form the pinch B-scope display system receiving the output signals from the radar receiver of FIG. 1 for display purposes.

Now referring to FIG. 1 there is shown terminals 10 and 11 each of which receive an incoming radar signal. The incoming radar signals are provided by a monopulse anti-jamming radar that employs an antenna feed and reflector system that propagates two radar beams at the same elevation angle in two closely spaced azimuth directions. One beam thus picks up an incoming signal before the other beam. The pair of incoming signals are mixed to form a sum and a difference signal. The incoming difference signal designated as $\Delta$ is fed to terminal 10 and the sum signal designated as $\Sigma$ to terminal 11 for application to mixer 12. It is to be noted that the present invention resides in the pinch receiver which receives two incoming signals and subsequently displays them on an oscilloscope.

Mixer 12 provides three output signals in which the first of the output is equal to $\Sigma + jc\Delta$ and the second to $\Sigma - jc\Delta$. The first and second output signals are received by phase detector 15 by way of limiting amplifiers 13 and 14, respectively. The output signal of phase detector 15 appears at terminal 16 and represents a ratio of the difference signal to the sum signal which gives a measure of angular difference between the antenna axis and the line of sight to the target.

A third output signal is also provided from mixer 12 which is received by detector 18 by way of intermediate frequency amplifier 17. The signal from detector 18 appears on terminal 19 and may be utilized as the normal video output signal for application to a display oscilloscope such as shown in FIG. 2.

The third output signal from mixer 12 is also received by intermediate frequency wide-band filter 20. The output from filter 20 is passed through intermediate frequency wide-band limiter 21 for application to intermediate frequency narrow band filter 22. The output signal from filter 22 is received by envelope detector 23 and the output signal therefrom appears at terminal 24.

Wide-band intermediate frequency filter 20 permits input power (system noise, signals, and jamming signals) having wide-band frequencies centered about the target signal to pass through wide-band limiter 21. Wide-band limiter 21 is designed for radar system noise saturation and is thus able to "normalize" or "compress" the total input power. Thus, with a proper setting of the threshold, or detectable, level of envelope detector 23 target signals stronger than jamming signals will be detected while jamming signals go undetected. Of course, if jamming signals at any frequency within the wide-band range, become severe enough, the target signal is pushed below the detector's level and will be treated as noise so that a condition of no-target information exists.

Now referring to FIG. 2, showing the display system utilizing the output signals from the receiver shown in FIG. 1, there is shown oscilloscope 43 having display face 40. Terminal 33 receives a trigger input from the aforementioned anti-jamming radar which is applied to range sweep generator 34. Push-pull amplifier 35 receives the output of generator 34 and provides the requisite signals to drive vertical deflection plates 38.

Terminal 31 receives a signal input from terminal 16 of FIG. 1 and is a ratio of the difference signal to the sum signal which gives a measure of angular difference between the anti-jamming radar antenna axis and the line of sight to the target. Terminal 32 receives a d.c. voltage that represents the antenna angle. This d.c. voltage is obtained conventionally by utilizing a potentiometer and a d.c. source of voltage in connection with aforesaid antenna, the magnitude of the d.c. voltage being related to the degree of antenna azimuth rotation. The ratio signal is represented by $\Delta\theta$ and the d.c. voltage by $\theta a$. Both of which are then applied to summing amplifier 36 so that when this ratio is added to the d.c. voltage, the resultant signal, $\theta T$, is a measure of the true angle regardless of the position of the antenna. This target angle voltage is used as the horizontal deflection signal by applying it to horizontal plates 39 by way of push-pull amplifier 37 so that all of the returns from a given target paint at the same point on the display, even though the antenna beamwidth is several times as great as the display spot size. This is known as the "pinch" effect.

In the presence of a jamming signal when the sweep line of oscilloscope 43 moves to the point corresponding to the jammer azimuth, it proceeds to deposit a large number of sweeps on top of each other. This continues until the jammer is out of the main antenna lobe, at this point the sweep line resumes painting with a density of approximately one sweep per pulse period of antenna revolution. Thus, in terms of painting density, only the true jammer azimuth differs markedly. Thus "strobe" or "line" 41 displays the azimuth of the jammer.

In order to display the target signal provided by way of the anti-jamming radar and the pinch receiver, the output signal from terminal 19 of FIG. 2 is received by terminal 30 for application to control grid 43 thereby operating to produce intensity modulation which will result in display of targets 42.

It is to be noted that the foregoing technique and apparatus causes a signal from a jammer to be presented along a "strobe" or "line" on the display to indicate the direction of the jammer. However, while performing the useful function of locating a jammer, the "strobe" hides a target having the same azimuth as the jammer even when the target signal is stronger than the jamming signal. In that event, the output signal from terminal 24 of FIG. 1 is applied to terminal 30 of FIG. 2 and where the target signals are stronger than the jamming signals, they will be intensified and be visible in spite of the display "strobe". Thus there is provided a display which gives the jammer direction in the form of a visible strobe as well as the skin echo (target) radar range in the form of an intensification of the "strobe" at the radar range. This type of display provides in a single indicator, the indication of jamming without obliterating the target range.

While a particular embodiment of the invention has been shown and described, modifications may be made. It is intended in the appended claims to cover all such modifications as fall within the true spirit and scope of the invention.

What is claimed is:

1. In an anti-jamming radar having an antenna propagating a pair of beams at the same elevation angle in two closely spaced azimuth directions and receiving first and second incoming signals to be added and subtracted to and from each other to provide sum and difference signals, a radar receiver and associated display oscilloscope comprising mixer means in combination with a phase detector receiving said sum and difference signals and operating to provide a signal output being a ratio of said sum and difference signal, means to add a d.c. voltage to said ratio signal to provide a resultant signal, said d.c. voltage being representative of the azimuth angle of said antenna, a wide-band filter receiving an output signal from said mixer, a narrow band filter receiving a signal from said wide-band filter by way of a wide-band limiter, an envelope detector connected to said narrow band filter, and an oscilloscope having a cathode, a control grid, and a pair of vertical and horizontal deflection plates, said resultant signal being received by said horizontal plates and the output signal from said envelope detector being received by said control grid.

2. In an anti-jamming radar having an antenna propagating a pair of beams at the same elevation angle in two closely spaced azimuth directions and receiving first and second incoming signals to be added and subtracted to provide a separate sum and difference signals, a radar receiver and its associated display oscilloscope comprising a mixer receiving said sum and difference signal for mixing and providing three output signals, a first detector receiving a first and second input signal by way of said mixer and providing an output signal that is representative of the ratio of said sum and difference signal, a second detector receiving said third output signal from said mixer and providing a normal video output signal, a wide-band filter also receiving said third output signal, a narrow band filter receiving the output signal from said wide-band filter by way of a wide-band limiter, a third detector connected to said narrow band filter and also operating to provide a video output signal, an oscilloscope having cathode, control grid and a pair of vertical and horizontal deflection plates, said video output signals from said second and third detectors being applied to said control grid, said vertical plates receiving a range sweep voltage, a summing amplifier having two inputs, one of said two inputs receiving the output signal from said first detector, the other of said two inputs receiving a d.c. voltage representative of the azimuth angle of said antenna, and a push-pull amplifier receiving the resultant signal from said summing amplifier and operating to provide a pair of signals to said pair of horizontal plates.

3. In an anti-jamming radar, a radar receiver and its associated display oscilloscope as defined in claim 2 wherein said first detector operates to provide an output signal being the difference in phase between said two input signals thereto, and said second and third detectors operate to detect the envelope of said input signals thereto.

* * * * *